(No Model.)

L. ROBERTS.
BRAKE FOR RAILWAY CARS.

No. 529,082. Patented Nov. 13, 1894.

WITNESSES
A. A. Kelly
Wallace Murdock

INVENTOR.
Luke Roberts
by Church & Church
his Attys

UNITED STATES PATENT OFFICE.

LUKE ROBERTS, OF BRADFORD, ENGLAND.

BRAKE FOR RAILWAY-CARS.

SPECIFICATION forming part of Letters Patent No. 529,082, dated November 13, 1894.

Application filed December 23, 1893. Serial No. 494,584. (No model.)

*To all whom it may concern:*

Be it known that I, LUKE ROBERTS, a subject of the Queen of England, residing at Bradford, England, have invented Improvements in Certain Brake Mechanism for Railway and other Similar Vehicles, of which the following is a specification.

This invention relates to improvements in the brake mechanism for which Letters Patent of the United States, No. 491,664 were granted to me on the 27th day of December, 1892.

The said improvements are particularly applicable to railway wagons and other similar vehicles usually coupled together in numbers and the principal object of the invention is to enable the brake to be taken off by pressure upon the buffer or buffers. For this purpose I connect the draw-bar at each end of the vehicle to each other in such a manner that they are capable of independent motion but are each arranged to take off the brake when power is applied to them to move the vehicle. One or both of the buffers at each end of the vehicle is or are also arranged in connection with the brake mechanism or the cross-bar in such a manner that when pressure is applied to the said buffer or buffers the motion thereon takes off the brake. By this arrangement a train of vehicles fitted with this brake may be started forward or shunted backward with every facility. A convenient arrangement is to fit the brake to be applied by the weight of one side only of the vehicle and to arrange it to be withdrawn by one buffer at each end of the vehicle. In this case the lifting mechanism operated by the draw-bar may be mounted on a support carried by the axle boxes at one side.

Reference is to be had to the accompanying sheet of drawings, forming a part of this specification in which similar letters of reference indicate corresponding parts in each of the figures.

Figure 1:
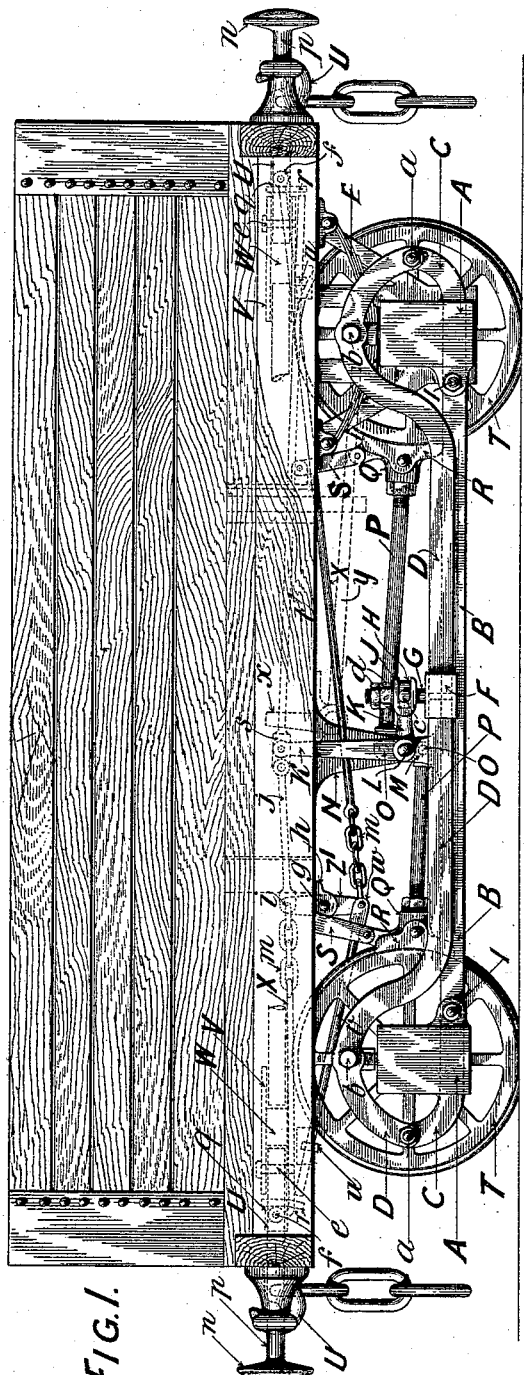
Figure 2:
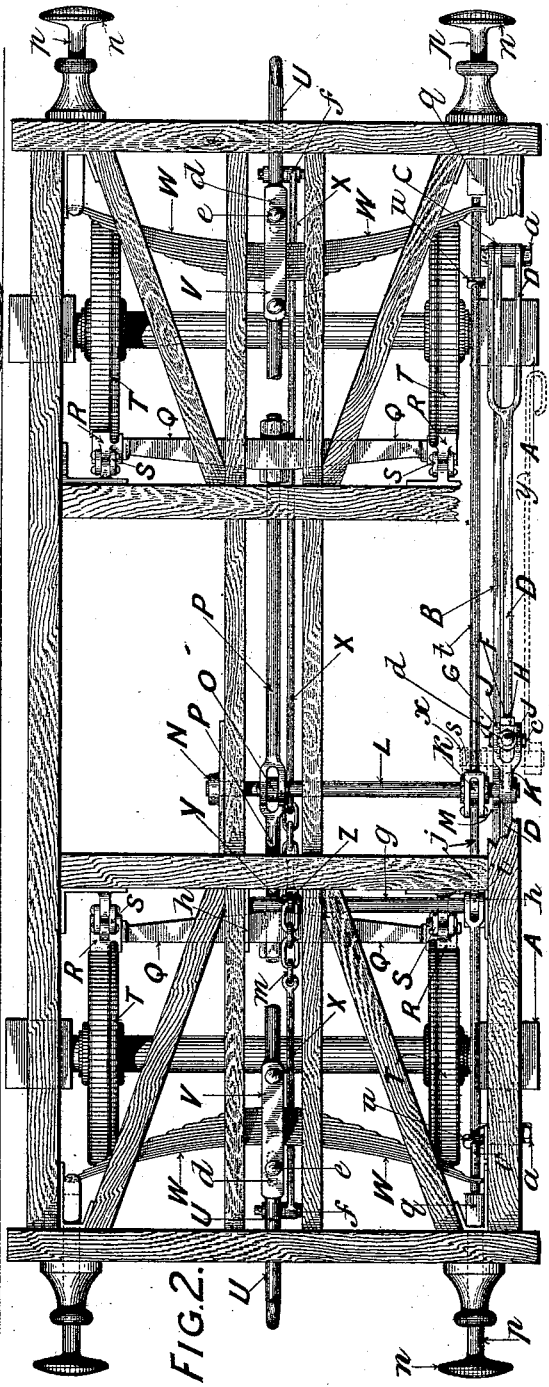

Figure 1, represents a side elevation of a railway truck fitted with my improvements in which the horns and springs at one end are omitted to show certain other parts in full. Fig. 2, is a plan view of the same with the bottom of the truck omitted and a portion of one of the side beams broken away to disclose the parts beneath.

A simple and efficient method of arranging the lifting mechanism to remove the brake by the draw-bar consists in connecting the axle boxes A, A at one side of the vehicle by the bar B the ends of which are passed through slots in the axle boxes prepared to receive them and their outer ends turned up as shown by C, C to form fulcra for the lifting levers D, D which latter are forked at their outer ends to facilitate pivoting them to C, C by the bolts $a, a$ and also to enable the springs at that side (one spring is represented by E Fig. 1) to more or less lie in the forked ends and be suspended therein by the bolts $b, b$. B is also fixed by the bolts I, I to lugs on the axle boxes.

The inner ends of D, D are connected together by the box or coupling piece F into which they freely pass and this coupling piece is provided with a pin G freely passing through the block or swivel piece H fixed by its trunnions $c, c$ in the bifurcated limbs J, J of the forked arm K, keyed or otherwise rigidly secured upon the rocking shaft L.

The nuts $d, d$ are screwed upon the top of G to bear upon the upper face of H.

The rocking shaft L is mounted at its outer end in the bearings M formed on B and its inner end is mounted in the hanger N fixed to the central framework of the truck. This rocking shaft in many respects resembles the ordinary hand brake shaft and is provided with a double armed lever O the ends of which are pivoted to the brake rods P, P connected to the brake levers Q, Q arranged in the ordinary way to press the brake blocks R, swung by the links S against the wheels T.

The draw bars U, U instead of being rigidly connected to the straps V, V of the buffer springs W, W have a slot $d$ formed in them through which the pin or cotter $e$ is passed so as to allow the draw-bar a certain amount of independent longitudinal motion before tending to move the trucks. The draw-bars are connected by the rods X, X mounted upon the studs $f, f$ projecting from U, U to the lever Y having an arm Z projecting from U, U above and below in a similar manner to the arms $i$ and $w$ of the lever Z' hereinafter referred to. The lever Y is secured upon the rocking shaft $g$ mounted in bearings $h, h$ secured to the under side of the framework. The arm $i$ of the lever Z' at the other end of the rocking shaft $g$ is connected by the rod $j$ to the top of the long arm $k$ rigidly secured upon the rocking shaft L.

It will be obvious from the foregoing description that when power is applied to either of the draw-bars to move the vehicles the draw-bar is first moved longitudinally within the limits allowed by the slots $d$ which has the effect of partially turning the rocking shaft $g$ and the motion of this shaft is communicated to the shaft L through the medium of the arm $i$, the rod $j$ and the arm $k$ thereby withdrawing the brake shoes from the wheels and at the same time slightly raising the side of the vehicle shown in Fig. 1 by means of the forked arm K lifting the inner ends of the levers D; and as soon as the power to move the vehicle is removed from the draw-bar the weight of the body of the vehicle through the medium of the levers D, D and connecting parts turns the rocking shaft L to apply the brake and at the same time restores the parts to their normal position when the vehicle is at rest. The links or short chains $m, m$ are introduced into X, X to prevent one draw-bar from being moved by the motion of the other and also to allow the buffer mechanism to operate the shaft $g$ in the manner hereinafter described without moving the draw-bars.

To enable an inward movement of either of the buffers $n, n$ (at one side of the vehicle) to operate the lever $k$ to remove the brake the buffers $n$ are so arranged that their spindles $p, p$ are capable of a certain amount of longitudinal motion before the shoes $q, q$ engage the ends of the buffer springs W, W and these shoes have each a projecting piece $r\ r$ on their under sides adapted when the buffer spindles are moved longitudinally to engage the end of the rods $t$ and $v$. The rods $t$ and $v$ have their outer ends supported in guide eyes $u, u$ secured to the side frame and the inner end of $t$ is directly connected to the long arm $k$ while $v$ is connected to the arm $w$ of Z'. From this description it will be clearly seen that an inward movement of one or both of the buffer spindles will remove the brake and operate the levers D in a similar manner to an extension of either of the draw bars and that when this inward pressure upon the buffer is removed the weight of the body of the vehicle will in a similar manner reapply the brake.

To enable the brake to be removed by hand the forked end $x$ of the hand lever $y$ is arranged to bear against the shoulders $s$ on the rod $t$ (as shown by the broken lines representing this lever in both figures) so that raising such lever removes the brake and lowering such lever applies it.

It is obvious that in those railway vehicles not fitted with spring buffers, false buffers or pushes may be provided projecting beyond the buffer beam of the vehicle and adapted to be operated in the same manner as the spring buffers to remove the brake.

I claim—

1. In a railway or other vehicle, the combination with the brakes normally applied by the weight of the vehicle, of mechanism for operating the brakes, devices through which the power is applied to move the vehicle, and connections between said last mentioned devices and the brake operating mechanism, whereby when power is applied to move the vehicle in either direction the brakes will be thrown off, substantially as described.

2. In a railway or other vehicle, the combination with the brakes normally applied by the weight of the vehicle, of mechanism for operating the brakes, devices located at one end of the vehicle for moving it in either direction, and connections between said last mentioned devices and the brake operating mechanism, whereby when the car is moved the brakes will be thrown off; substantially as described.

3. In a railway or other vehicle, the combination with the rock shaft, of the double armed lever mounted on said rock shaft, and connected to the brake rods, and intermediate mechanism for rocking said shaft when the vehicle is moved in either direction, substantially as and for the purpose set forth.

4. In a railway or other vehicle, the combination with the rock shaft mounted in suitable bearings, the two armed lever mounted on said rock shaft, the brake rods connected to the ends of said lever, and to the brake levers, the arm carried by the rock shaft and mechanism connecting said arm and drawbars, whereby when power is applied to the drawbar to move the vehicle, the shaft will be rocked and the brakes thrown off; substantially as set forth.

5. In a railway or other vehicle, the combination with the rock shaft mounted in suitable bearings, of the two armed lever carried by said rock shaft, the brake rods pivotally connected to said lever and to the brake levers, the arm also carried by said rock shaft, and the rock shaft $g$ carried in suitable bearings, the drawbars, the rods connecting the drawbars and said last mentioned rock shaft, and connection between the two rock shafts, whereby when the drawbars are moved said rock shafts will be rocked and the brakes removed; substantially as described.

6. In a railway or other vehicle, the combination with the rock shaft L mounted in suitable bearings, the two armed lever and arm carried thereby, of the rock shaft $g$, carried in suitable bearings, the two armed lever Y carried by said rock shaft, the draw bars, and rods connecting them to said lever Y, the lever Z', having two arms, also carried by said rock shaft $g$, and the rod $j$ connected to one arm of the lever Z' and to the arm $k$ carried by the rock shaft L, substantially as and for the purpose set forth.

7. In a railway or other vehicle, the combination with the drawbars at each end of the vehicle, of the brake mechanism, such as described, the rods connecting the drawbars and brake mechanism, and the flexible connection at the ends of the rods, whereby the drawbars may be moved independently, substantially as set forth.

8. In a railway or other vehicle, the combination with the brakes, normally applied by the weight of the vehicle, mechanism for operating the brakes, the lifting lever sustaining the weight of the vehicle, and connections between the brake mechanism and lifting lever, whereby when the brakes are removed the vehicle will be lifted; substantially as described.

9. In a railway or other vehicle, the combination with the brakes applied by the weight of the vehicle, the rod connected to the axle boxes on one side of the vehicle, the lifting levers supporting the vehicle pivotally connected at its ends with said rod, of the block into which the ends of the levers pass, the pin having the trunnions carried by said block, the rock shaft L, the forked arm having the bifurcated limbs, within which the trunnions of the block have a bearing, brake operating mechanism, substantially as described, connected with said rock shaft, whereby when the rock shaft is turned to remove the brakes, the inner ends of the lifting levers will be raised by the forked arms and the vehicle lifted; as set forth.

10. In a railway or other vehicle, the combination with the brakes normally applied by the weight of the vehicle, the buffers at each end, connection such as described, between the buffers and brakes, whereby when the buffers are moved inwardly the brakes will be thrown off; substantially as set forth.

11. In a railway car or other vehicle, the combination with the brakes normally applied by the weight of the vehicle the rock shaft mounted in suitable bearings, the two armed lever carried by said shaft, the brake rods connected to said two armed lever and to the brake levers, the arm $k$ also carried by said rock shaft, the rock shaft $g$, carried in suitable bearings, the lever Z', carried by said rock shaft, the rod $j$, connected to the arm $i$ and arm $k$, the buffers, the rods $t$ and $v$, the former connected to the arm $k$ and the latter to the arm $w$ of lever Z', whereby when the rods are moved inwardly the brakes will be thrown off; substantially as described.

12. In a railway or other vehicle, the combination with the brakes normally applied by the weight of the vehicle, the lifting levers, mechanism for operating both the brakes and lifting levers, the buffer spindle capable of longitudinal motion and connections between the buffer spindle and the before mentioned mechanism, whereby when the buffer spindles are moved inwardly said mechanism will be operated, the brakes thrown off and the vehicle lifted; substantially as described.

In testimony whereof I have hereunto set my hand in the presence of two subscribing witnesses.

LUKE ROBERTS.

Witnesses:
 DAVID NOWELL,
 SAMUEL A. DRACUP.